(12) United States Patent
Teraoka

(10) Patent No.: US 10,641,999 B2
(45) Date of Patent: May 5, 2020

(54) CAMERA LENS

(71) Applicant: AAC Acoustic Technologies (Shenzhen) Co., Ltd., Shenzhen (CN)

(72) Inventor: Hiroyuki Teraoka, Shenzhen (CN)

(73) Assignee: AAC Acoustic Technologies (Shenzhen) Co., Ltd., ShenZhen (CN)

( * ) Notice: Subject to any disclaimer, the term of this patent is extended or adjusted under 35 U.S.C. 154(b) by 164 days.

(21) Appl. No.: 16/040,647

(22) Filed: Jul. 20, 2018

(65) Prior Publication Data
US 2020/0026035 A1 Jan. 23, 2020

(51) Int. Cl.
*G02B 9/62* (2006.01)
*G02B 13/00* (2006.01)

(52) U.S. Cl.
CPC .......... G02B 13/0045 (2013.01); G02B 9/62 (2013.01)

(58) Field of Classification Search
CPC ........ G02B 9/62; G02B 9/64; G02B 13/0045; G02B 13/005

USPC ........ 359/708–713, 745, 749–752, 754–756, 359/761
See application file for complete search history.

(56) References Cited

U.S. PATENT DOCUMENTS

| | | | |
|---|---|---|---|
| 2016/0223796 A1* | 8/2016 | Lee | G02B 9/62 |
| 2016/0320590 A1* | 11/2016 | Mori | G02B 13/0045 |
| 2018/0356613 A1* | 12/2018 | Chen | G02B 13/06 |

* cited by examiner

*Primary Examiner* — Darryl J Collins
(74) *Attorney, Agent, or Firm* — IPro, PLLC; Na Xu

(57) ABSTRACT

The invention provides a camera lens. The camera lens includes, in an order from an object side to an image side: a first lens with a negative refractive power, a second lens with a positive refractive power, a third lens with a positive refractive power, and a fourth lens with a negative refractive power, a fifth lens with a positive refractive power and a sixth lens with a negative refractive power. The camera lens further satisfies specific conditions for providing improved performance.

5 Claims, 5 Drawing Sheets

CAMERA LENS

FIELD OF THE PRESENT DISCLOSURE

The invention relates to a camera lens. In particular, the invention relates to mobile phone camera assembly, WEB camera lens, etc, which are suitable for using camera elements such as high-pixel CCD, CMOS, etc. At the same time, the invention also relates to the camera lens consists of 6 small sized lenses with wide angle as view angle (hereinafter referred to as 2ω) over 100° and excellent optical properties.

DESCRIPTION OF RELATED ART

In recent years, various kinds of camera devices using camera components such as CCD and CMOS, have become widely popular. With the development of miniaturization and high performance of camera elements, the society needs small camera lenses with excellent optical properties and wide angle.

The development of technology related to the camera lens consisting of 6 small lenses with excellent optical properties and wide angle is in progress step by step. The proposed solution is that the camera lens consists of 6 lenses, which are arranged in turn from object side as follows: a first lens with negative refractive power, a second lens with positive refractive power, a third lens with positive refractive power, a fourth lens with negative refractive power, and a fifth lens with positive refractive power, a sixth lens with negative refractive power.

The camera lens of the related technology consists of the above 6 lenses. However, the refractive power distribution of the first lens and the second lens, the shape of the fourth lens are not sufficient., so 2ω=105° wide-angle, total track length (hereinafter referred to as TTL)≥10.68 mm wide-angle and miniaturization are not sufficient. The camera lens of other related technology consists of the above 6 lenses. However, the refractive power distribution of the first, second and fourth lens, the shape of the fourth and fifth lens are not sufficient., so 2ω≤98.2°, TTL≥18.601 mm wide-angle and miniaturization are not sufficient.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 1:
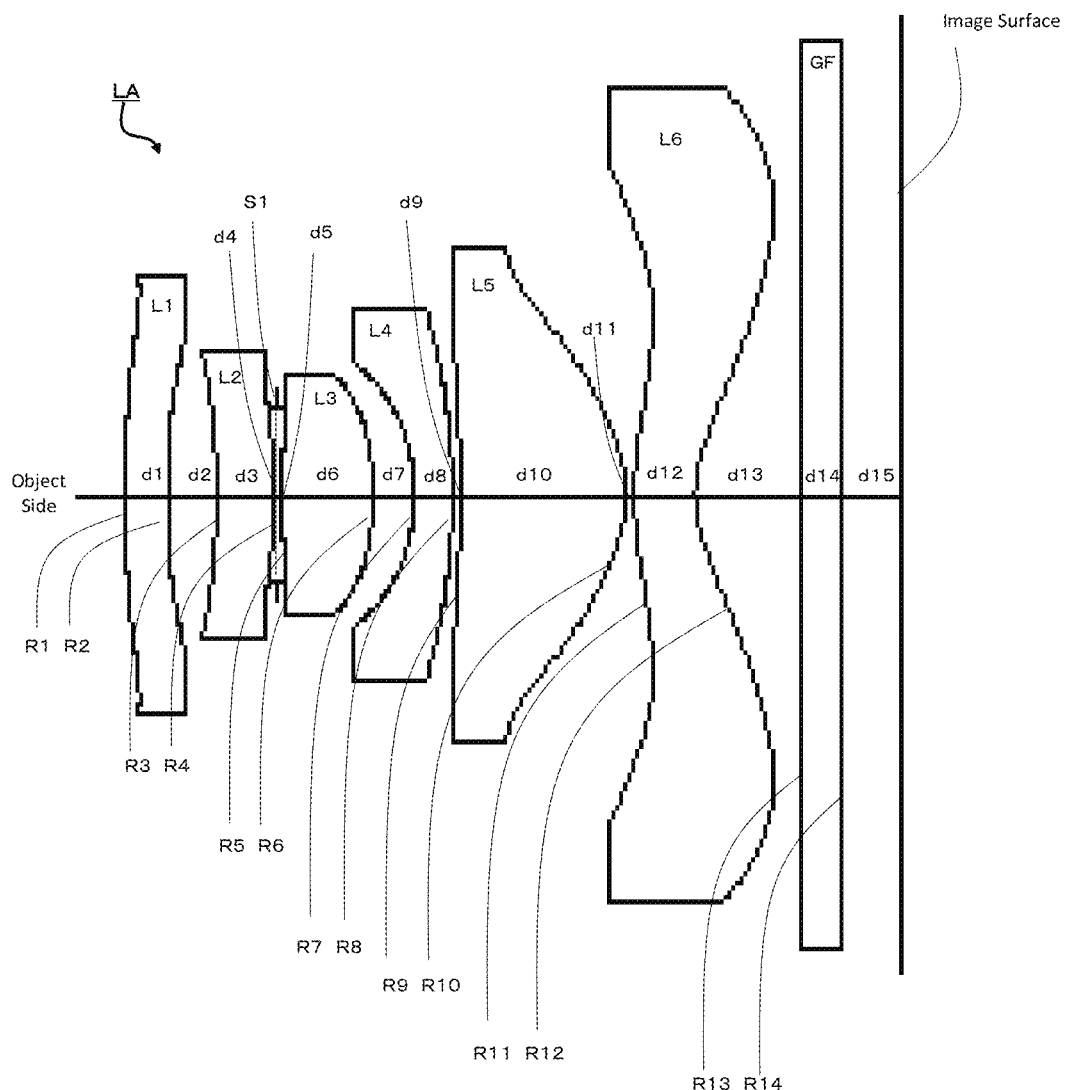
FIG. 1 is an illustrative structural view of a camera lens LA related to the present invention.

An embodiment of a camera lens related to the present invention is illustrated with reference to the drawings. FIG. 1 shows a composition display diagram of a camera lens of an embodiment of the present invention. The camera lens LA consists of the following 6 lens which are arranged in turn from object side to image side: a first lens L1, a second lens L2, a third lens L3, a fourth lens L4, a fifth lens L5, and a sixth lens L6. A glass plate GF is arranged between the sixth lens L6 and image surface. The glass plate GF may use a glass cover sheet or a filter with an IR cut-off function. It is also fine if a glass plate is not provided between the sixth lens L6 and the image surface.

The first lens L1 has negative refractive power, the second lens L2 has positive refractive power, the third lens L3 has positive refractive power, the fourth lens L4 has negative refractive power, and the fifth lens L5 has positive refractive power, the sixth lens L6 has negative refractive power. In order to correct the aberration better, the surfaces of these 6 lenses should be better designed as aspherical surfaces.

The camera lens LA is a camera lens meeting the following conditions (1)-(4):

$$-9.00 \leq f1/f \leq -2.20 \quad (1)$$

$$4.00 \leq f2/f \leq 16.00 \quad (2)$$

$$0.80 \leq (R1+R2)/(R1-R2) \leq 4.00 \quad (3)$$

$$-2.00 \leq (R7+R8)/(R7-R8) \leq -0.50 \quad (4)$$

where,
f: The focal length of the whole camera lens
f1: Focal length of the first lens;
f2: Focal length of the second lens;
R1: The curvature radius of the object side surface of the first lens;
R2: The curvature radius of the image side surface of the first lens;
R7: The curvature radius of the object side surface of the fourth lens;
R8: The curvature radius of the image side surface of the fourth lens;

The condition (1) specifies the negative refractive power of the first lens L1. It is difficult to develop toward wide-angle and miniaturization with excellent optical properties outside the scope of condition (1). In this case, it is better to set the value range of the condition (1) within the value range of the following condition (1-A).

$$-8.30 \leq f1/f \leq -2.65 \quad (1-A)$$

The condition (2) specifies the positive refractive power of the second lens L2. It is difficult to develop toward wide-angle and miniaturization with excellent optical properties outside the scope of condition (2). In this case, it is better to set the value range of the condition (2) within the value range of the following condition (2-A).

$$4.30 \leq f2/f \leq 14.80 \quad (2\text{-A})$$

The condition (3) specifies the shape of the first lens L1. It is difficult to develop toward wide-angle and miniaturization with excellent optical properties outside the scope of condition (3). In this case, it is better to set the value range of the condition (3) within the value range of the following condition (3-A).

$$1.15 \leq (R1+R2)/(R1-R2) \leq 3.60 \quad (3\text{-A})$$

The condition (4) specifies the shape of the fourth lens L4. It is difficult to develop toward wide-angle and miniaturization with excellent optical properties outside the scope of condition (4). In this case, it is better to set the value range of the condition (4) within the value range of the following condition (4-A).

$$-1.95 \leq (R7+R8)/(R7-R8) \leq -0.60 \quad (4\text{-A})$$

The third lens L3 has positive refractive power and meets the following conditions (5),(6):

$$0.50 \leq f3/f \leq 1.50 \quad (5)$$

$$0.30 \leq (R5+R6)/(R5-R6) \leq 1.00 \quad (6)$$

where,
f: The focal length of the whole camera lens
f3: The focal length of the third lens;
R5: The curvature radius of the object side surface of the third lens L3;
R6: The curvature radius of the image side surface of the third lens L3.

Condition (5) specifies positive refractive power of the third lens L3. It is difficult to develop toward wide-angle and miniaturization with excellent optical properties outside the scope of condition (5). In this case, it is better to set the value range of the condition (5) within the value range of the following condition (5-A).

$$0.80 \leq f3/f \leq 1.15 \quad (5\text{-A})$$

Condition (6) specifies the shape of the third lens L3. It is difficult to develop toward wide-angle and miniaturization with excellent optical properties outside the scope of condition (6). In this case, it is better to set the value range of the condition (6) within the value range of the following condition (6-A).

$$0.34 \leq (R5+R6)/(R5-R6) \leq 0.60 \quad (6\text{-A})$$

The fourth lens L4 has negative refractive power, and meets the following condition (7).

$$-2.00 \leq f4/f \leq -0.80 \quad (7)$$

where,
f: focal length of the whole camera lens;
f4: focal length of the fourth lens.

Condition (7) specifies negative refractive power of the fourth lens L4. It is difficult to develop toward wide-angle and miniaturization with excellent optical properties outside the scope of condition (7). In this case, it is better to set the value range of the condition (7) within the value range of the following condition (1-A):

$$-1.60 \leq f4/f \leq -0.95 \quad (7\text{-A})$$

The fifth lens L5 has positive refractive power, and meets the following condition (8).

$$0.40 \leq f5/f \leq 1.00 \quad (8)$$

where,
f: focal length of the whole camera lens;
f5: focal length of the fifth lens.

Condition (8) specifies positive refractive power of the fifth lens L5. It is difficult to develop toward wide-angle and miniaturization with excellent optical properties outside the scope of condition (8). In this case, it is better to set the value range of the condition (8) within the value range of the following condition (8-A).

$$0.55 \leq f5/f \leq 0.75 \quad (8\text{-A})$$

The sixth lens L6 has negative refractive power, and meets the following condition (9).

$$-2.00 \leq f6/f \leq -0.60 \quad (9)$$

where,
f: focal length of the whole camera lens;
f6: focal length of the sixth lens.

Condition (9) specifies negative refractive power of the sixth lens L6. It is difficult to develop toward wide-angle and miniaturization with excellent optical properties outside the scope of condition (9). In this case, it is better to set the value range of the condition (9) within the value range of the following condition (9-A).

$$-1.45 \leq f6/f \leq -0.75 \quad (9\text{-A})$$

Because each of the 6 lenses of which the camera lens LA consists has the composition described above and meets the condition, it is possible to produce a camera lens with wide-angle, small size and excellent optical properties.

f: The focal length of the whole camera lens LA;
f1: The focal length of the first lens L1;
f2: The focal length of the second lens L2;
f3: The focal length of the third lens L3;
f4: The focal length of the fourth lens L4;
f5: The focal length of the fifth lens L5;
f6: The focal length of the sixth lens L6;
Fno: F value;
2ω: View angle;
S1: Open aperture;
R: The curvature radius of the optical surface, the center curvature radius in case of lens;
R1: The curvature radius of the object side surface of the first lens L1;
R2: The curvature radius of the image side surface of the first lens L1;
R3: The curvature radius of the object side surface of the second lens L2;
R4: The curvature radius of the image side surface of the second lens L2;
R5: The curvature radius of the object side surface of the third lens L3;
R6: The curvature radius of the image side surface of the third lens L3;
R7: The curvature radius of the object side surface of the fourth lens L4;
R8: The curvature radius of the image side surface of the fourth lens L4;
R9: The curvature radius of the object side surface of the fifth lens L5;
R10: The curvature radius of the image side surface of the fifth lens L5;
R11: The curvature radius of the object side surface of the sixth lens L6;
R12: The curvature radius of the image side surface of the sixth lens L6;

R13: The curvature radius of the object side surface of the glass plate GF;

R14: The curvature radius of the image side surface of the glass plate GF;

d: The center thickness of a lens or the distance between lenses.

d1: The center thickness of the first lens L1;

d2: The axial distance from the image side surface of the first lens L1 to the object side surface of the second lens L2;

d3: The center thickness of the second lens L2;

d4: The axial distance from the image side surface of the second lens L2 to the object side surface of the open aperture S1;

d5: The axial distance from the open aperture S1 to the object side surface of the third lens L3;

d6: The center thickness of the third lens L3;

d7: The axial distance from the image side surface of the third lens L3 to the object side surface of the fourth lens L4;

d8: The center thickness of the fourth lens L4;

d9: The axial distance from the image side surface of the fourth lens L4 to the object side surface of the fifth lens L5;

d10: The center thickness of the fifth lens L5;

d11: The axial distance from the image side surface of the fifth lens L5 to the object side surface of the glass plate GF;

d12: The center thickness of the sixth lens L6;

d12: The axial distance from the image side surface of the sixth lens L6 to the object side surface of the glass plate GF;

d14: The center thickness of the glass plate GF;

d15: The axial distance from the image side surface to the image surface of the glass plate GF;

nd: The refraction index of the d line;

nd1: The refraction index of the d line of the first lens L1;

nd2: The refraction index of the d line of the second lens L2;

nd3: The refraction index of the d line of the third lens L3;

nd4: The refraction index of the d line of the fourth lens L4;

nd5: The refraction index of the d line of the fifth lens L5;

nd6: The refraction index of the d line of the sixth lens L6;

nd7: The refraction index of the d line of the glass plate GF;

vd: The abbe number;

v1: The abbe number of the first lens L1;

v2: The abbe number of the second lens L2;

v3: The abbe number of the third lens L3;

v4: The abbe number of the fourth lens L4;

v5: The abbe number of the fifth lens L5;

v6: The abbe number of the sixth lens L6;

v7: The abbe number of the glass plate GF;

TTL: Total track length (the axial distance from the object side surface to the image side surface of the first lens L1);

LB: The axial distance from the image side surface to the image surface of the sixth lens L6(including the thickness of the glass plate GF)

IH: Image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (10)$$

Of which, R is the curvature radius on the axis and k is the cone coefficient, A4, A6, A8, A10, A12, and A14 and A16 are aspherical coefficients.

For convenience, the aspherical surface shown in the formula (10) is used for the aspherical surface of each lens surface. However, the present invention is not limited to the aspherical polynomials form shown in the formula (10).

Embodiment 1

Figure 2:
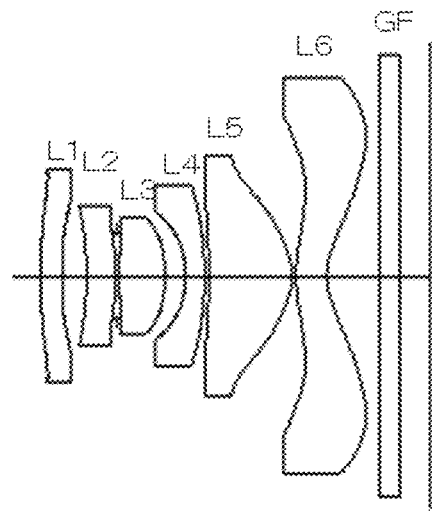
FIG. 2 is an illustrative structural view of a camera lens in accordance with a first embodiment of the present invention.

FIG. 2 is a configuration composition diagram of the camera lens LA in Embodiment 1. The data of first lens L1-sixth lens L6 of which the camera lens LA consists in example 1 shown in Table 1 are as follows: the curvature radius R of the object side and image side, the center thickness of the lens and the distance d between lenses, refraction index nd, Abbe number vd. The data shown in Table 2 are: cone coefficients k, aspheric coefficients.

TABLE 1

|  | R | d |  | nd |  | vd |  |
|---|---|---|---|---|---|---|---|
| R1 | 8.84645 | d1 = | 0.233 | nd1 | 1.5352 | v1 | 56.12 |
| R2 | 4.20768 | d2 = | 0.273 |  |  |  |  |
| R3 | -3.29815 | d3 = | 0.319 | nd2 | 1.6397 | v2 | 23.53 |
| R4 | -2.74722 | d4 = | 0.028 |  |  |  |  |
| S1 | ∞ | d5 = | 0.020 |  |  |  |  |
| R5 | 3.77352 | d6 = | 0.506 | nd3 | 1.5441 | v3 | 56.12 |
| R6 | -1.17816 | d7 = | 0.228 |  |  |  |  |
| R7 | -0.85646 | d8 = | 0.213 | nd4 | 1.6397 | v4 | 23.53 |
| R8 | -2.92052 | d9 = | 0.046 |  |  |  |  |
| R9 | -4.54732 | d10 = | 0.919 | nd5 | 1.5352 | v5 | 56.12 |
| R10 | -0.58910 | d11 = | 0.049 |  |  |  |  |
| R11 | 1.37703 | d12 = | 0.339 | nd6 | 1.5352 | v6 | 56.12 |
| R12 | 0.48711 | d13 = | 0.600 |  |  |  |  |
| R13 | ∞ | d14 = | 0.210 | nd7 | 1.5168 | v7 | 64.17 |
| R14 | ∞ | d15 = | 0.346 |  |  |  |  |

TABLE 2

|  | Conic Index | Aspherical Index | | | | | | |
|---|---|---|---|---|---|---|---|---|
|  | k | A4 | A6 | A8 | A10 | A12 | A14 | A16 |
| R1 | 1.9490E+01 | 1.2481E-01 | -7.2806E-02 | -5.6390E-02 | 1.9862E-02 | 0.0000E+00 | 0.0000E+00 | 0.0000E+00 |
| R2 | 2.1949E+01 | 1.8199E-01 | -6.3936E-02 | -3.6258E-02 | -2.8811E-02 | 0.0000E+00 | 0.0000E+00 | 0.0000E+00 |
| R3 | 0.0000E+00 | -2.1713E-02 | -8.1091E-02 | 1.4306E-01 | -2.7134E-01 | 0.0000E+00 | 0.0000E+00 | 0.0000E+00 |
| R4 | 0.0000E+00 | -3.2922E-02 | 2.8919E-01 | -4.4373E-01 | -1.0945E+00 | 0.0000E+00 | 0.0000E+00 | 0.0000E+00 |
| R5 | -5.1918E+01 | -9.0040E-02 | 1.1746E-01 | -5.0457E+00 | 8.2788E-01 | -1.4275E+00 | -3.7757E+01 | -2.1583E+02 |
| R6 | 2.4193E+00 | -1.6404E-01 | -5.7681E-01 | 5.3171E-01 | 1.9670E-01 | 2.4312E+00 | -1.1380E+01 | -1.2574E+01 |
| R7 | -4.1139E-01 | -4.4420E-01 | -7.6958E-01 | 6.5842E-01 | 3.1991E+00 | 5.2538E-01 | -1.2649E+01 | 1.8446E+01 |
| R8 | 0.0000E+00 | -5.1517E-02 | 7.8239E-02 | -9.6458E-02 | 8.4596E-02 | 0.0000E+00 | 0.0000E+00 | 0.0000E+00 |
| R9 | 0.0000E+00 | 1.1906E-01 | -8.0769E-02 | 1.2369E-02 | 2.3879E-02 | 0.0000E+00 | 0.0000E+00 | 0.0000E+00 |
| R10 | -2.9988E+00 | -2.7288E-01 | 1.0420E-01 | 2.9353E-02 | 1.3497E-02 | 8.7496E-03 | 2.9950E-03 | -7.1292E-03 |
| R11 | -8.8491E+00 | -1.4107E-01 | 3.8970E-03 | 4.0763E-03 | 1.4866E-03 | 1.4684E-04 | -1.8226E-05 | -4.3985E-05 |
| R12 | -3.7452E+00 | -9.8938E-02 | 2.7360E-02 | -5.2012E-03 | -2.0446E-04 | 4.3114E-05 | 1.4262E-05 | -2.6020E-08 |

Table 5 which appears afterwards shows the various values in embodiments 1, 2 and the values corresponding with the parameters which are already specified in the conditions (1)-(9).

As shown in table 5, Embodiment 1 meets the conditions (1)-(9).

Figure 3:
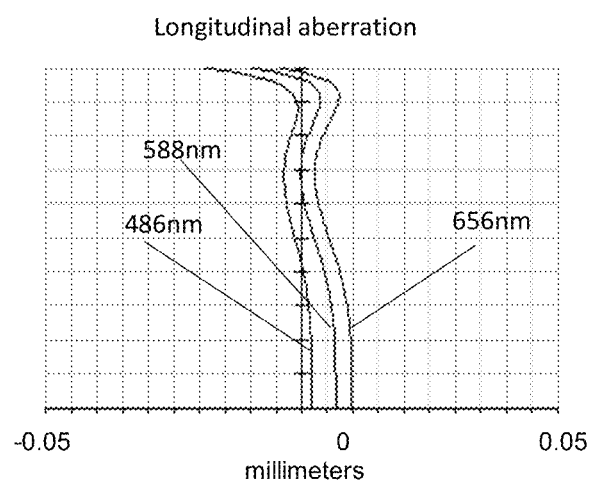
FIG. 3 shows the longitudinal aberration of the camera optical lens shown in FIG. 2.
Figure 4:
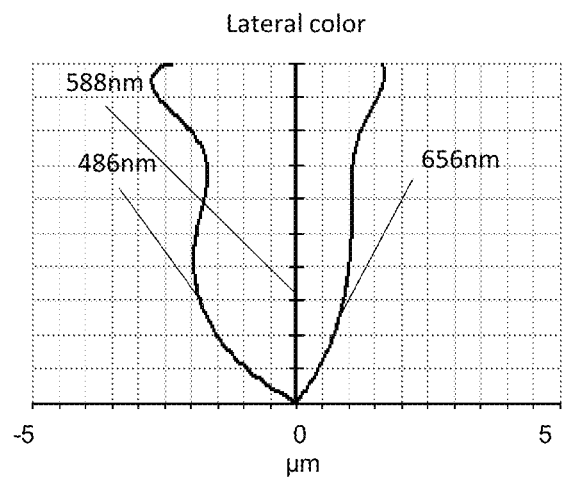
FIG. 4 shows the lateral color of the camera optical lens shown in FIG. 2.
Figure 5:
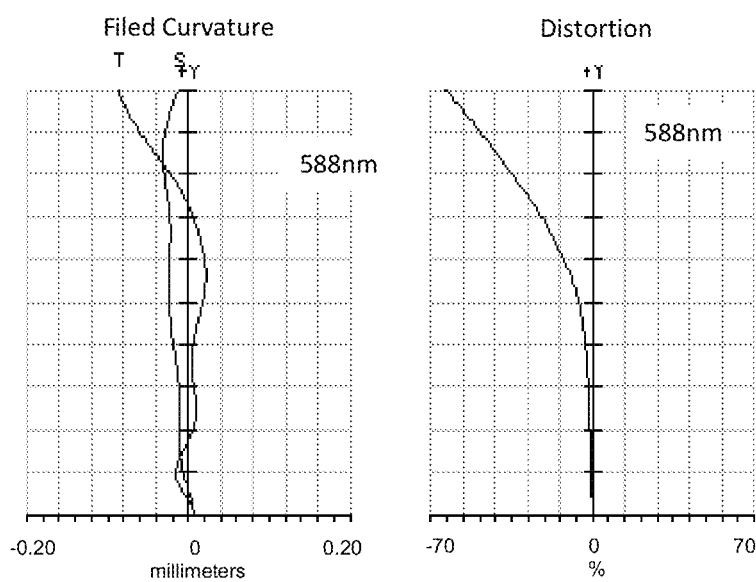
FIG. 5 presents a schematic diagram of the field curvature and distortion of the camera optical lens shown in FIG. 2.

The longitudinal aberration of the camera lens LA in embodiment 1 is shown in FIG. 3, the lateral color is shown in FIG. 4, and the field curvature and distortion are shown in FIG. 5. In addition, the field curvature S in FIG. 5 is the field curvature opposite to the sagittal image surface, T is the field curvature opposite to the tangent image surface. The same applies in Embodiment 2. As shown in FIGS. 3-5, in embodiment 1, the camera lens LA has Fno=2.44, 2ω=145.9°, TTL=4.329 mm wide-angle and small size, so it is not difficult to understand why the camera lens has excellent optical properties.

Embodiment 2

Figure 6:
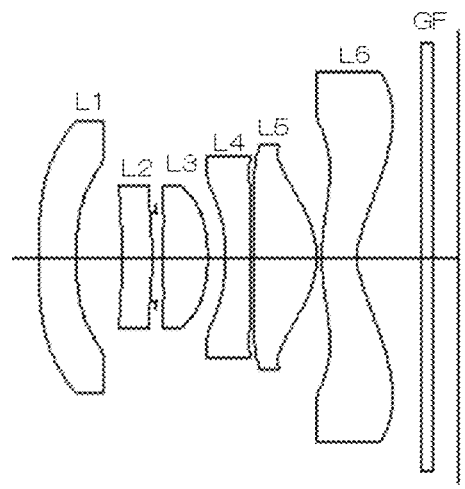
FIG. 6 is a schematic diagram of a camera optical lens in accordance with a second embodiment of the present invention.

FIG. 6 is a configuration composition diagram of the camera lens LA in example 2. The data of third lens L3-sixth lens L6 of which the camera lens LA consists in example 1 shown in Table 3 are as follows: the curvature radius R of the object side and image side, the center thickness of the lenses and the distance d between lenses, refraction index nd, Abbe number vd. The data shown in Table 4 are: cone coefficients k, aspheric coefficient.

TABLE 3

| | R | d | | nd | vd |
|---|---|---|---|---|---|
| R1 | 7.39876 | d1 = 0.351 | nd1 | 1.5352 | v1 56.12 |
| R2 | 2.32065 | d2 = 0.426 | | | |
| R3 | −17.30060 | d3 = 0.286 | nd2 | 1.6397 | v2 23.53 |
| R4 | −5.05831 | d4 = 0.033 | | | |
| S1 | ∞ | d5 = 0.070 | | | |
| R5 | 4.26982 | d6 = 0.422 | nd3 | 1.5439 | v3 55.95 |
| R6 | −1.18175 | d7 = 0.167 | | | |
| R7 | −1.38123 | d8 = 0.235 | nd4 | 1.6510 | v4 21.51 |
| R8 | 34.21368 | d9 = 0.039 | | | |
| R9 | −11.46360 | d10 = 0.587 | nd5 | 1.5439 | v5 55.95 |
| R10 | −0.50698 | d11 = 0.045 | | | |
| R11 | 1.55734 | d12 = 0.331 | nd6 | 1.5352 | v6 56.12 |
| R12 | 0.44118 | d13 = 0.600 | | | |
| R13 | ∞ | d14 = 0.110 | nd7 | 1.5168 | v7 64.17 |
| R14 | ∞ | d15 = 0.238 | | | |

As shown in table 5, the Embodiment 2 meets the conditions (1)-(9).

Figure 7:
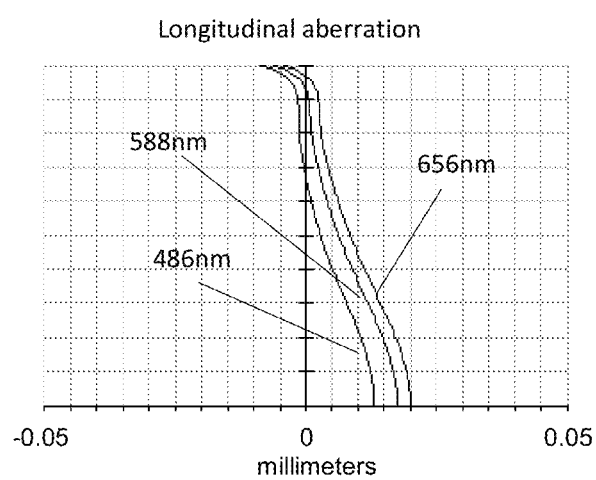
FIG. 7 presents the longitudinal aberration of the camera optical lens shown in FIG. 6.
Figure 8:
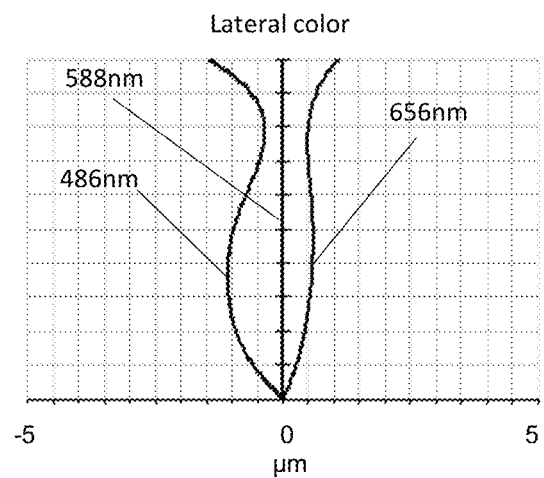
FIG. 8 presents the lateral color of the camera optical lens shown in FIG. 6.
Figure 9:
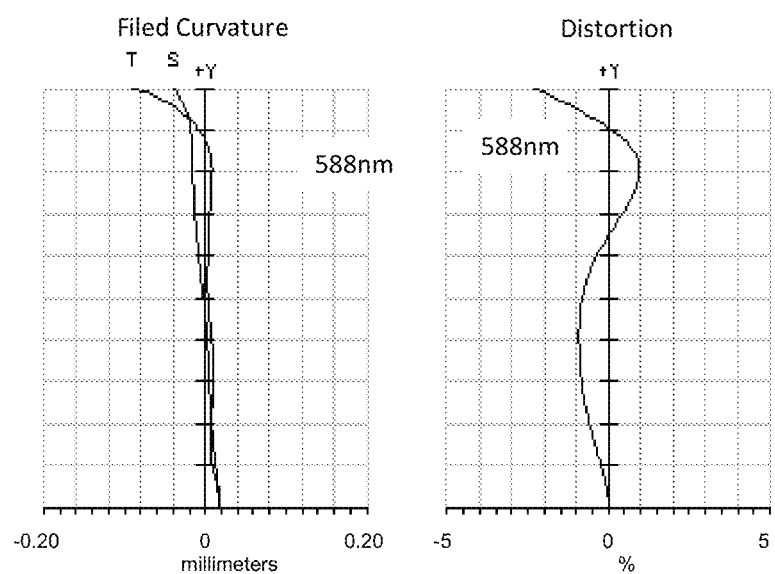
FIG. 9 presents the field curvature and distortion of the camera optical lens shown in FIG. 6.

The longitudinal aberration of the camera lens LA in Embodiment 2 is shown in FIG. 7, the lateral color is shown in FIG. 8, and the field curvature and distortion are shown in FIG. 9. As shown in FIGS. 7-9, the camera lens LA in embodiment 2 has Fno=2.40, 2ω=100.0°, TTL=3.940 mm wide-angle and small size, so it is not difficult to understand why it has excellent optical properties.

Table 5 shows various values of the embodiments and the values corresponding with the parameters which are already specified in the conditions (1)-(9). In addition, numerical units shown in Table 5 are 2 ω (°), f(mm), f1(mm), f2(mm), f3(mm), f4(mm), f5(mm), TTL(mm), LB(mm), IH(mm).

TABLE 5

| | Embodiment 1 | Embodiment 2 | Condition |
|---|---|---|---|
| f1/f | −7.846 | −4.124 | 1 |
| f2/f | 10.783 | 7.054 | 2 |
| (R1 + R2)/(R1 − R2) | 2.814 | 1.914 | 3 |
| (R7 + R8)/(R7 − R8) | −1.830 | −0.922 | 4 |
| f3/f | 0.880 | 1.114 | 5 |
| (R5 + R6)/(R5 − R6) | 0.524 | 0.566 | 6 |
| f4/f | −1.015 | −1.296 | 7 |
| f5/f | 0.602 | 0.610 | 8 |
| f6/f | −0.835 | −0.817 | 9 |
| Fno | 2.44 | 2.40 | |
| 2ω | 145.9 | 100.0 | |
| f | 1.945 | 1.570 | |
| f1 | −15.260 | −6.474 | |
| f2 | 20.973 | 11.074 | |
| f3 | 1.712 | 1.749 | |
| f4 | −1.974 | −2.034 | |
| f5 | 1.170 | 0.957 | |
| f6 | −1.624 | −1.283 | |
| TTL | 4.329 | 3.940 | |
| LB | 1.156 | 0.948 | |
| IH | 2.297 | 1.814 | |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

TABLE 4

| | Conic Index | Aspherical Index | | | | | | |
|---|---|---|---|---|---|---|---|---|
| | k | A4 | A6 | A8 | A10 | A12 | A14 | A16 |
| R1 | 2.3361E+01 | 2.4840E−01 | −8.3927E−02 | 1.3938E−02 | 2.0131E−03 | 0.0000E+00 | 0.0000E+00 | 0.0000E+00 |
| R2 | 6.4521E+00 | 3.4014E−01 | 2.2233E−01 | −8.0855E−02 | −2.6679E−02 | 0.0000E+00 | 0.0000E+00 | 0.0000E+00 |
| R3 | 0.0000E+00 | −9.8391E−02 | −7.3417E−01 | 1.2017E+00 | 0.0000E+00 | 0.0000E+00 | 0.0000E+00 | 0.0000E+00 |
| R4 | 0.0000E+00 | −1.1027E−01 | −6.9695E−01 | 1.8289E+00 | 0.0000E+00 | 0.0000E+00 | 0.0000E+00 | 0.0000E+00 |
| R5 | −3.9804E+01 | −2.8138E−01 | −1.9034E+00 | −1.2616E+00 | 2.5095E+01 | −1.8255E+02 | −1.3876E+03 | 8.8110E+03 |
| R6 | 1.9845E+00 | −2.9328E−01 | −1.4982E+00 | 2.0494E+00 | 4.5224E+00 | −1.9805E+01 | −1.3739E+02 | 4.5382E+02 |
| R7 | −7.0961E−01 | −3.8461E−01 | −6.0400E−01 | 2.0540E+00 | 5.2460E+00 | 1.0188E+00 | −1.6181E+01 | −3.0798E+00 |
| R8 | 0.0000E+00 | −1.4810E−01 | 1.1124E−01 | 1.2859E−02 | 1.4730E−01 | 0.0000E+00 | 0.0000E+00 | 0.0000E+00 |
| R9 | 0.0000E+00 | 1.2312E−01 | −1.1914E−01 | −3.1505E−02 | 2.4583E−01 | 0.0000E+00 | 0.0000E+00 | 0.0000E+00 |
| R10 | −3.3504E+00 | −3.0140E−01 | 2.4149E−01 | 1.8239E−01 | 1.1863E−01 | 7.8022E−02 | 5.9354E−03 | −1.5332E−01 |
| R11 | −3.8693E+00 | −2.6423E−01 | −8.2691E−03 | 1.8736E−02 | 8.9028E−03 | −2.8955E−04 | −1.9826E−03 | 2.5736E−03 |
| R12 | −4.3250E+00 | −1.3635E−01 | 3.5501E−02 | −5.0654E−03 | −8.9013E−04 | −4.4172E−04 | −1.4648E−05 | 8.4076E−05 |

What is claimed is:

1. A camera lens comprising, in an order from an object side to an image side: a first lens with a negative refractive power, a second lens with a positive refractive power, a third lens with a positive refractive power, and a fourth lens with a negative refractive power, a fifth lens with a positive refractive power and a sixth lens with a negative refractive power; wherein the camera lens further satisfies the following conditions (1)~(4):

$$-9.00 \leq f1/f \leq -2.20 \quad (1)$$

$$4.00 \leq f2/f \leq 16.00 \quad (2)$$

$$0.80 \leq (R1+R2)/(R1-R2) \leq 4.00 \quad (3)$$

$$-2.00 \leq (R7+R8)/(R7-R8) \leq -0.50 \quad (4)$$

where,
 f: focal length of the whole camera lens;
 f1: focal length of the first lens;
 f2: focal length of the second lens;
 R1: curvature radius of the object side surface of the first lens;
 R2: curvature radius of the image side surface of the first lens;
 R7: curvature radius of the object side surface of the fourth lens;
 R8: curvature radius of the image side surface of the fourth lens.

2. The camera lens as described in claim 1 further satisfying the following conditions (5)~(6):

$$0.50 \leq f3/f \leq 1.50 \quad (5)$$

$$0.30 \leq (R5+R6)/(R5-R6) \leq 1.00 \quad (6)$$

where,
 f: focal length of the whole camera lens;
 f3: focal length of the third lens;
 R5: curvature radius of the object side surface of the third lens;
 R6: The curvature radius of the image side surface of the third lens.

3. The camera lens as described in claim 1 further satisfies the following condition (7):

$$-2.00 \leq f4/f \leq -0.80 \quad (7)$$

where,
 f: focal length of the whole camera lens;
 f4: focal length of the fourth lens.

4. The camera lens as described in claim 1 further satisfying the following condition (8):

$$0.40 \leq f5/f \leq 1.00 \quad (8)$$

where,
 f: focal length of the whole camera lens;
 f5: focal length of the fifth lens.

5. The camera lens as described in claim 1 further satisfying the following condition (9):

$$-2.00 \leq f6/f \leq -0.60 \quad (9)$$

where,
 f: focal length of the whole camera lens;
 f6: focal length of the sixth lens.

* * * * *